US012316222B2

(12) United States Patent
Park et al.

(10) Patent No.: US 12,316,222 B2
(45) Date of Patent: May 27, 2025

(54) DC-DC CONVERSION DEVICE HAVING COUPLING INDUCTOR

(71) Applicant: KOREA AEROSPACE RESEARCH INSTITUTE, Daejeon (KR)

(72) Inventors: Jung Un Park, Daejeon (KR); Ja-Chun Koo, Daejeon (KR); Sang-Kyoo Han, Daejeon (KR); Ji Hun Bae, Seoul (KR); Nayoung Lee, Daejeon (KR); Jae Dong Choi, Sejong-si (KR)

(73) Assignee: KOREAN AEROSPACE RESEARCH INSTITUTE, Daejeon (KR)

( * ) Notice: Subject to any disclaimer, the term of this patent is extended or adjusted under 35 U.S.C. 154(b) by 315 days.

(21) Appl. No.: 17/597,187

(22) PCT Filed: Nov. 24, 2020

(86) PCT No.: PCT/KR2020/016634
§ 371 (c)(1),
(2) Date: Dec. 28, 2021

(87) PCT Pub. No.: WO2021/132901
PCT Pub. Date: Jul. 1, 2021

(65) Prior Publication Data
US 2023/0132923 A1    May 4, 2023

(30) Foreign Application Priority Data
Dec. 27, 2019    (KR) .......................... 10-2019-0176348

(51) Int. Cl.
*H02M 3/158*    (2006.01)
*H02J 7/00*    (2006.01)
(Continued)

(52) U.S. Cl.
CPC ............. *H02M 3/158* (2013.01); *H02J 7/007* (2013.01); *H02M 1/0064* (2021.05); *H02M 1/15* (2013.01)

(58) Field of Classification Search
CPC ........ H02M 1/08; H02M 3/158; H02M 3/156; H02M 1/0095; H02M 1/0064; H02M 1/14; H02M 1/15
See application file for complete search history.

(56) References Cited

U.S. PATENT DOCUMENTS 3,902,107 A * 8/1975 Brown ................ H02M 7/5236
                                                          363/136
5,959,438 A * 9/1999 Jovanovic ............. H02M 3/158
                                                          363/21.01
(Continued)

FOREIGN PATENT DOCUMENTS

CN    106655366 A  *  5/2017  ............ H02J 7/0029
EP    2973974 B1  *  5/2020  ............ H02M 3/158
(Continued)

OTHER PUBLICATIONS

Weinberg, A. et al., "A High Power, High Frequency, DC to DC Converter for Space Applications.," Proceedings of the PESC '92 Record. 23rd Annual IEEE Power Electronics Specialists Conference, Jun. 29, 1992, Toledo Spain, 8 pages.
(Continued)

*Primary Examiner* — Gustavo A Rosario-Benitez
(74) *Attorney, Agent, or Firm* — McCoy Russell LLP (57) ABSTRACT

According to the present invention, an output inductor, rather than being composed of a separate inductor element, is magnetically coupled to a third inductor and a fourth inductor constituting a second transformer. Thus, compared to the case in which the output inductor is composed of the separate inductor element independently of the third induc-
(Continued)

tor and the fourth inductor, the cost as well as the volume of the DC-DC conversion device can be reduced.

8 Claims, 10 Drawing Sheets

(51) Int. Cl.
*H02M 1/00* (2007.01)
*H02M 1/15* (2006.01)

(56) References Cited

U.S. PATENT DOCUMENTS

| | | | | |
|---|---|---|---|---|
| 6,094,038 | A * | 7/2000 | Lethellier | H02M 3/1588 |
| | | | | 323/282 |
| 6,434,029 | B1 * | 8/2002 | Cyr | H02M 3/158 |
| | | | | 323/222 |
| 2004/0113596 | A1 * | 6/2004 | Peron | H02M 3/155 |
| | | | | 323/282 |
| 2008/0054874 | A1 | 3/2008 | Chandrasekaran et al. | |
| 2010/0061122 | A1 * | 3/2010 | Okubo | H02M 3/158 |
| | | | | 363/20 |

FOREIGN PATENT DOCUMENTS

| | | |
|---|---|---|
| KR | 20100135988 A | 12/2010 |
| KR | 20180077965 A | 7/2018 |
| KR | 102005881 B1 | 8/2019 |
| KR | 20190136294 A | 12/2019 |

OTHER PUBLICATIONS

ISA Korean Intellectual Property Office, International Search Report Issued in Application No. PCT/KR2020/016634, May 27, 2021, WIPO, 3 pages.

* cited by examiner

DC-DC CONVERSION DEVICE HAVING COUPLING INDUCTOR

CROSS REFERENCE TO RELATED APPLICATIONS

The present application is a U.S. National Phase of International Application No. PCT/KR2020/016634 entitled "DC-DC CONVERSION DEVICE HAVING COUPLING INDUCTOR," and filed on Nov. 24, 2020. International Application No. PCT/KR2020/016634 claims priority to Republic of Korea Patent Application No. 10-2019-0176348 filed on Dec. 27, 2019. The entire contents of each of the above-listed applications are hereby incorporated by reference for all purposes.

TECHNICAL FIELD

The present disclosure relates to a DC-DC conversion device having a coupling inductor, which may reduce a ripple of an output current compared to a conventional DC-DC converter.

BACKGROUND AND SUMMARY

Figure 1:
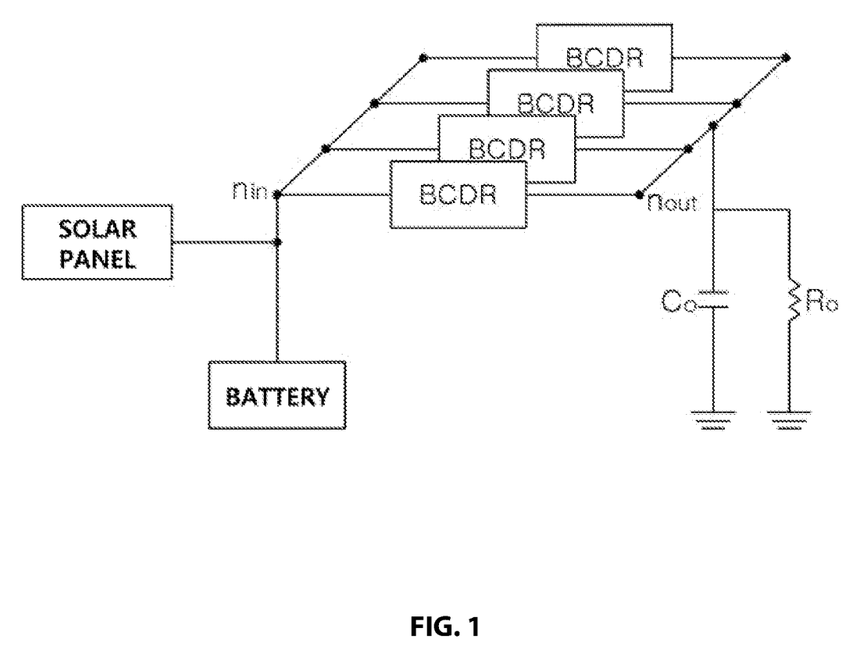
FIG. 1 is a diagram schematically illustrating a bus power system in a satellite.

FIG. 1 is a diagram schematically illustrating a bus power system in a satellite.

As illustrated in FIG. 1, the bus power system in the satellite includes a solar panel, a battery charge-discharge regulator (BCDR), a battery, and a load. The bus power system in the satellite typically uses the solar panel as a voltage source to generate power, some of the power generated by the solar panel is charged to the battery, and the remaining power after charging the battery or the power which is already charged in the battery is supplied to an output capacitor and an output resistor through the BCDR.

The output resistor corresponds to the load consuming the power generated by the solar panel, and the output capacitor serves to store the power required by the output resistor, and then to supply the power stored in the output capacitor to the output resistor when the power is required by the output resistor. The output capacitor is charged by an effective output current (RMS current), and in this case, if the effective output current is too large, the output capacitor is deteriorated and a lifespan of the output capacitor is shortened.

Here, the shortening of the lifespan of the output capacitor means that the lifespan of the satellite including the output capacitor is also shortened. Therefore, in order to ensure the lifespan of the satellite, the output capacitor should be able to be charged by a stable output current, and to this end, it is necessary to reduce a ripple of an output current flowing through an output terminal of a DC-DC conversion device.

Figure 2:
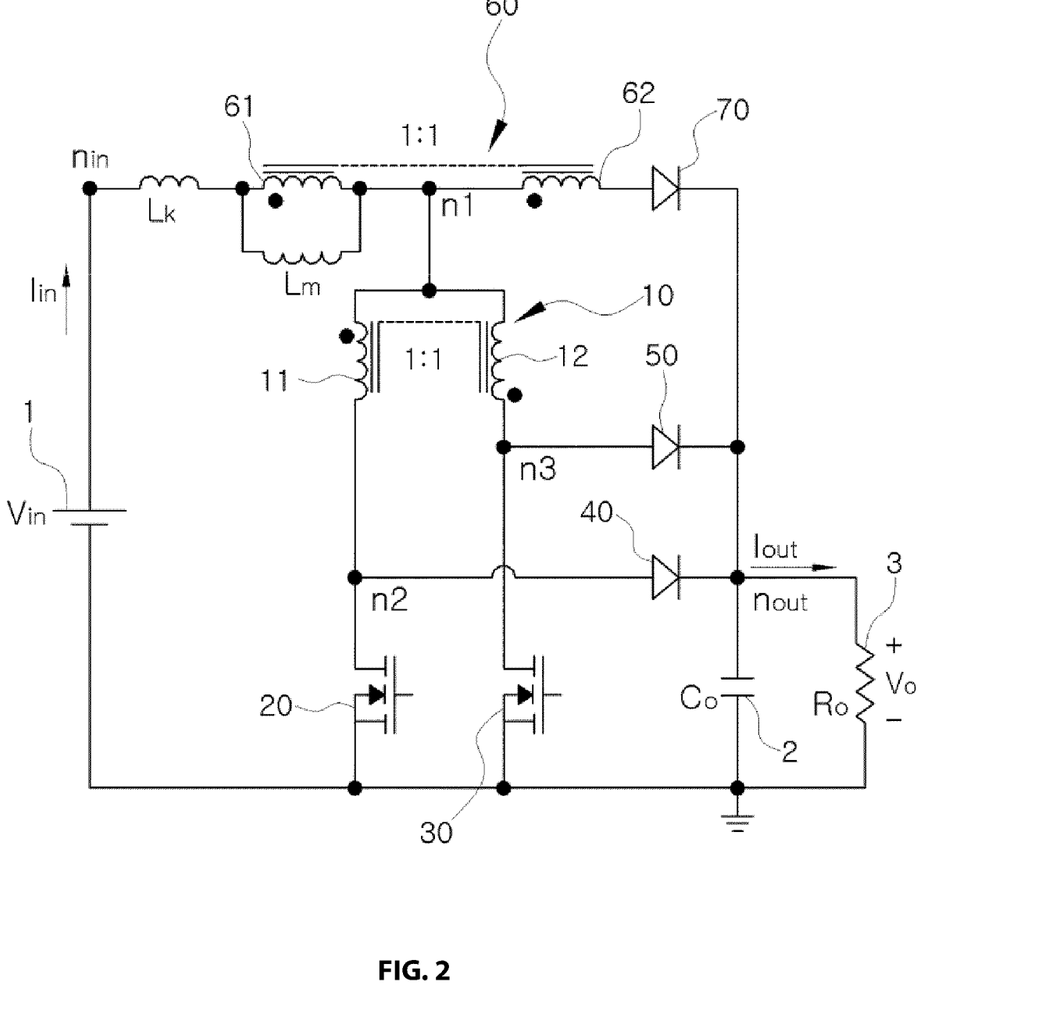
FIG. 2 is a diagram illustrating a conventional Weinberg DC-DC conversion device.

FIG. 2 is a diagram schematically illustrating a conventional Weinberg DC-DC conversion device, and the Weinberg DC-DC conversion illustrated in FIG. 2 is a device included in each BCDR illustrated in FIG. 1.

Such a Weinberg DC-DC conversion device is connected to a voltage source 1 and an output capacitor 2 in a bus power system, and serves to charge a DC-DC converted power to the output capacitor 2. However, the Weinberg DC-DC conversion device has a relatively large ripple of the output current, as will be described later. Accordingly, since the bus power system including the Weinberg DC-DC conversion may charge the output capacitor 2 by the output current having the relatively large ripple, there is a risk of shortening the lifespan of the output capacitor 2 and furthermore the lifespan of the satellite.

In order to solve such a problem, in Patent Document 1, the ripple of the output current flowing through the output terminal of the DC-DC conversion is reduced by adding a third switch Q3 and a fourth switch Q4 in addition to a first switch Q1 and a second switch Q2 included in the Weinberg DC-DC conversion device.

However, the third switch Q3 and the fourth switch Q4 added to Patent Document 1 correspond to active elements like the first switch Q1 and the second switch Q2, the control complexity of a control unit should be increased to control a plurality of active elements as described above, and drivers corresponding to the number of added active devices (e.g., gate drivers when the active elements are FETs) should be added. Consequently, there is a problem in that the volume, weight, and price of the DC-DC conversion device are increased.

RELATED ART DOCUMENT

Patent Document

Korean Patent No. 2005881

Non-Patent Document

A. H. Weinberg et al. "A HIGH POWER, HIGH FREQUENCY, DC TO DC CONVERTER FOR SPACE APPLICATIONS". IEEE. 1992.

DISCLOSURE

Technical Problem

An object of the present disclosure is to provide a DC-DC conversion device capable of reducing a ripple of an output current.

Further, an object of the present disclosure is to provide a DC-DC conversion device capable of reducing complexity, reducing volume and weight, and reducing cost that are caused by controlling a plurality of active elements.

Technical Solution

In one general aspect, a DC-DC conversion device includes: a first transformer connected between a ground and a first node between an input terminal to which an input voltage is applied and an output terminal to which an output voltage is applied, and including a first inductor and a second inductor that are magnetically coupled to each other; a first switch connected in series with the first inductor between the first node and the ground; a second switch connected in series with the second inductor between the first node and the ground; a first reverse current preventing element connected to a second node between the first inductor and the first switch and a fourth node between the input terminal and the output terminal; a second reverse current preventing element connected to a third node between the second inductor and the second switch, and the fourth node; a second transformer positioned between the input terminal and the output terminal and including a third inductor and a fourth inductor that are magnetically coupled to each other; a third reverse current preventing element connected to the fourth inductor and the fourth node; a link capacitor connected to the fourth node, and the first switch and the second switch; and an output inductor connected to the fourth node and the output terminal, in which the output inductor may be magnetically coupled to the third inductor and the fourth inductor.

One terminal of the third inductor may be connected to the input terminal, and the other terminal of the third inductor may be connected to the first node, and one terminal of the fourth inductor may be connected to the first node, and the other terminal of the fourth inductor may be connected to the third reverse current preventing element.

One terminal of the third inductor may be connected to the first switch, the second switch, and the link capacitor, and the other terminal of the third inductor may be connected to the ground, and one terminal of the fourth inductor may be connected to the first node, and the other terminal of the fourth inductor may be connected to the third reverse current preventing element.

The DC-DC conversion device may have sections in which the second switch is in a turned-off state when the first switch is turned on, the first switch is in the turned-off state when the second switch is turned on, and both the first switch and the second switch are in the turned-off state.

The first switch and the second switch may be alternately turned on at the same duty ratio, and the duty ratio may be less than 50%.

In the section in which both the first switch and the second switch are in the turned-off state, an output current may flow only through the third reverse current preventing element.

The first switch may be a first field effect transistor (FET) whose turn-on and turn-off operations are controlled by a first control signal input to a gate electrode, and the second switch may be a second FET whose turn-on and turn-off operations are controlled by a second control signal input to a gate electrode.

The DC-DC conversion device may further include a control unit for outputting the first control signal to the gate electrode of the first FET and outputting the second control signal to the gate electrode of the second FET.

Advantageous Effects

The DC-DC conversion device having a coupling inductor according to the present disclosure prevents a phenomenon in which the output current flowing to the output terminal causes a sudden change through passive elements such as a link capacitor and an output inductor, and according to the present disclosure, it is possible to significantly reduce the ripple generated in the output current.

Further, according to the present disclosure, since the number of active elements is small compared to the DC-DC conversion device of Patent Document 1, the complexity caused by controlling a plurality of active elements may be reduced, and the number of drivers for driving the plurality of active elements may also be reduced, and as a result, the volume and weight of the DC-DC conversion device may be reduced, and the price thereof may also be reduced.

Further, according to the present disclosure, since the output inductor is not formed of a separate inductor element, but is formed by being magnetically coupled to the third inductor and the fourth inductor constituting the second transformer, the volume and weight of the DC-DC conversion device may be reduced, and the price thereof may also be reduced compared to the case in which the output inductor is formed of the separate inductor element independently from the third and fourth inductors.

BEST MODE

Hereinafter, a DC-DC conversion device having a coupling inductor according to the present device will be described in detail with reference to the accompanying drawings. The accompanying drawings are provided by way of example in order to sufficiently transfer the spirit of the present disclosure to those skilled in the art, and the present disclosure is not limited to the accompanying drawings provided below, but may be implemented in other forms.

Before describing the DC-DC conversion device according to the present disclosure, a Weinberg DC-DC conversion device, which is one of the prior art, will be first described with reference to FIGS. 2 and 3.

FIG. 2 is a diagram schematically illustrating a conventional Weinberg DC-DC conversion device.

The Weinberg DC-DC conversion device illustrated in FIG. 2 may be included in each BCDR illustrated in FIG. 1, and includes a first transformer 10, a first switch 20, a second switch 30, a first reverse current preventing element 40, a second reverse current preventing element 50, a second transformer 60, and a third reverse current preventing element 70.

The first transformer 10 is connected between a ground and a first node n1 between an input terminal $n_{in}$ and an output terminal $n_{out}$, and includes a first inductor 11 and a second inductor 12 that are magnetically coupled to each other. Here, the first inductor 11 and the second inductor 12 are magnetically coupled to each other means that the first inductor 11 and the second inductor 12 share the same core and are inductively coupled to each other by the number of coils wound around the same core.

An input voltage $V_{in}$ is applied to the input terminal $n_{in}$ by a voltage source 1, and the input voltage $V_{in}$ causes an input current $I_{in}$ to flow. In addition, an output voltage $V_o$ is applied to the output terminal $n_{out}$, and the magnitude of the output voltage $V_o$ depends on a root mean square (RMS) value of an output current $I_{out}$.

The first switch 20 is connected in series with the first inductor 11 between the first node n1 and the ground. In addition, the second switch 30 is connected in series with the second inductor 12 between the first node n1 and the ground.

The first reverse current preventing element 40 is connected to a second node n2 between the first inductor 11 and the first switch 20 and the output terminal $n_{out}$. In addition, the second reverse current preventing element 50 is connected to a third node n3 between the second inductor 12 and the second switch 30 and the output terminal $n_{out}$.

The second transformer 60 is connected between the input terminal $n_{in}$ and the output terminal $n_{out}$, and includes a third inductor 61 and a fourth inductor 62 that are magnetically coupled to each other. Here, the third inductor 61 and the fourth inductor 62 are magnetically coupled to each other means that the third inductor 61 and the fourth inductor 62 share the same core and are inductively coupled to each other by the number of coils wound around the same core. The third inductor 61 is connected to the input terminal $n_{in}$ and the first node n1, and the fourth inductor 62 is connected to the first node n1 and the third reverse current preventing element 70. In addition, the third reverse current preventing element 70 is connected to the fourth inductor 62 and the output terminal $n_{out}$.

The output capacitor 2 may be connected to the output terminal $n_{out}$ and the ground of the Weinberg DC-DC conversion device, and an output resistor 3 may be connected in parallel to the output capacitor 2. Here, the output resistor 3 corresponds to a load consuming the power generated by the voltage source 1, and the output capacitor 2 serves to store the power required by the output resistor 3, and then to supply the power stored in the output capacitor 2 to the output resistor 3 when the power is required by the output resistor 3. The output capacitor 2 is charged by an RMS value of the output current $I_{out}$.

Figure 3A:
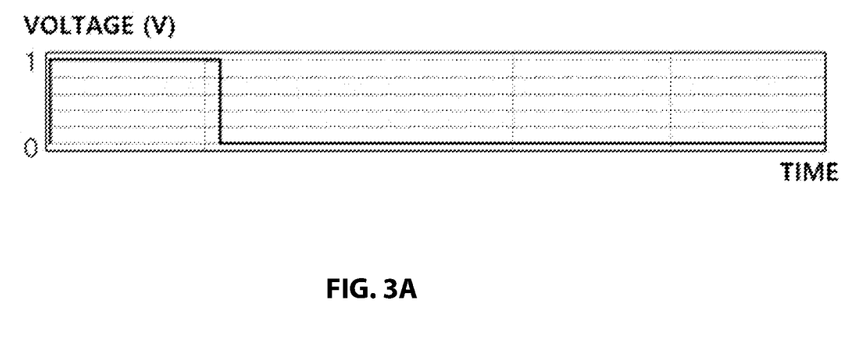
FIG. 3A is a diagram illustrating a waveform of a voltage applied to a first switch in the Weinberg DC-DC conversion device of FIG. 2.
Figure 3B:
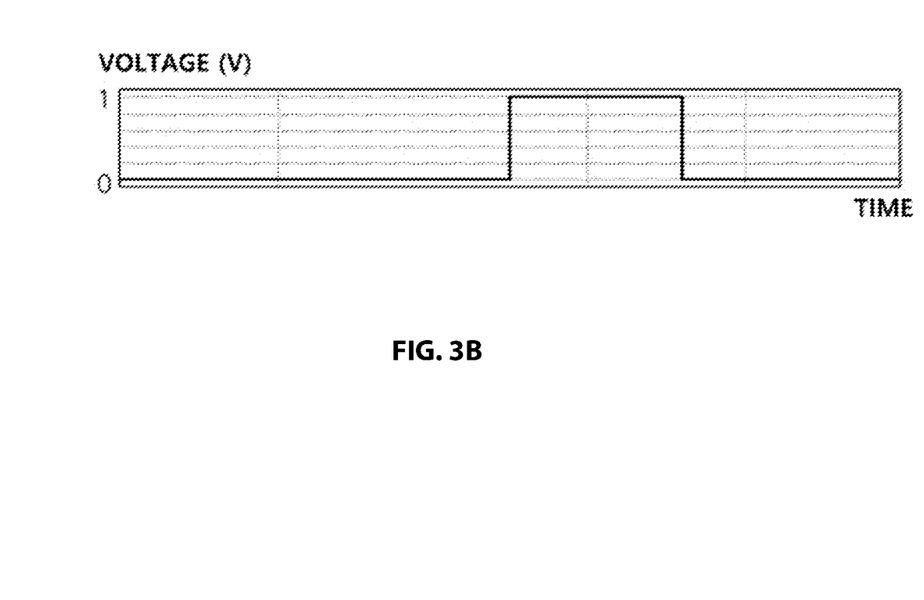
FIG. 3B is a diagram illustrating a waveform of a voltage applied to a second switch in the Weinberg DC-DC conversion device of FIG. 2.
Figure 3C:
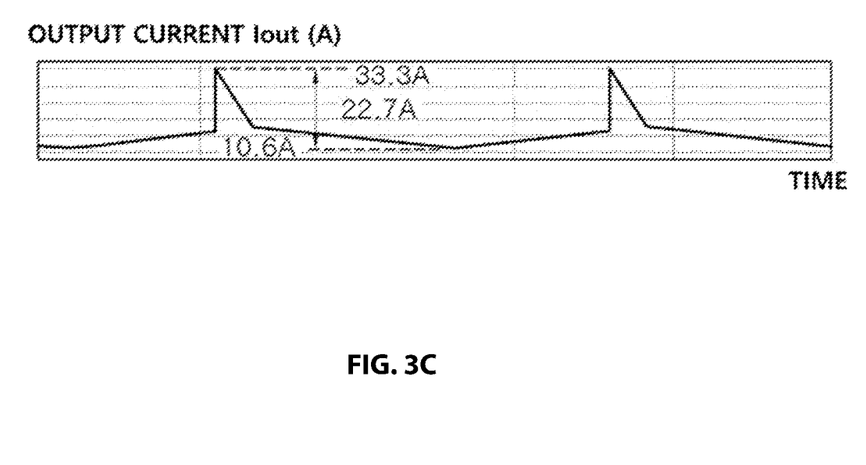
FIG. 3C is a diagram illustrating a waveform of an output current in the Weinberg DC-DC conversion device of FIG. 2.

FIG. 3A is a diagram illustrating a waveform of a voltage applied to a first switch in the Weinberg DC-DC conversion device of FIG. 2, FIG. 3B is a diagram illustrating a waveform of a voltage applied to a second switch in the Weinberg DC-DC conversion device of FIG. 2, and FIG. 3C is a diagram illustrating a waveform of an output current in the Weinberg DC-DC conversion device of FIG. 2. A ripple of the output current of the Weinberg DC-DC conversion device illustrated in FIG. 2 has a relatively large value as illustrated in FIG. 3C.

FIG. 3 will be described in detail. First, FIG. 3A illustrates a control signal applied to the first switch 20 of the Weinberg DC-DC conversion device of FIG. 2, and FIG. 3B illustrates a control signal applied to the second switch 30 of the Weinberg DC-DC conversion device of FIG. 2, where the Weinberg DC-DC conversion device also has sections in which the switch 30 is in the turned-off state when the first switch 20 is turned on, the first switch 20 is in the turned-off state when the second switch 30 is turned on, and both the first switch 20 and the second switch 30 are in the turned-off state.

First, when the first switch 20 is turned on in the state in which the second switch 30 is turned off, the input current $I_{in}$ by the voltage source 1 mainly flows through a current path including the third inductor 61, the first inductor 11, and the first switch 20, and a small amount of input current $I_{in}$ flows through a current path including the third inductor 61, the fourth inductor 62, and the third reverse current preventing element 70. In this case, an induced current is generated in the second inductor 12 by the current flowing through the first inductor 11, and the induced current generated in the second inductor 12 flows through the third node n3 to the output terminal $n_{out}$ through the second reverse current preventing element 50.

Next, when the first switch 20 is switched from the turned-on state to the turned-off state in the state in which the second switch 30 is turned off, the input current $I_{in}$ by the voltage source 1 flows through the third inductor 61. In this case, an induced current is generated in the fourth inductor 62 by the current flowing through the third inductor 61, and the induced current generated in the fourth inductor 62 flows to the output terminal $n_{out}$ through the third reverse current preventing element 70.

Next, when the second switch 10 is turned on in the state in which the first switch 20 is continuously turned off, the input current $I_{in}$ by the voltage source 1 mainly flows through a current path including the third inductor 61, the second inductor 12, and the second switch 30, and a small amount of input current $I_{in}$ flows through a current path including the third inductor 61, the fourth inductor 62, and the third reverse current preventing element 70. In this case, an induced current is generated in the first inductor 11 by the current flowing through the second inductor 12, and the induced current generated in the first inductor 11 flows through the second node n2 to the output terminal $n_{out}$ through the first reverse current preventing element 40.

As described above, when the first switch 20 is turned on in the state in which the second switch 30 is turned off, the induced current generated in the second inductor 12 flows through the third node n3 to the output terminal $n_{out}$ through the second reverse current preventing element 50. Thereafter, when the first switch 20 is switched from the turned-on state to the turned-off state in the state in which the second switch 30 is continuously turned off, only the induced current generated in the fourth inductor 62 needs to flow to the output terminal $n_{out}$ through the third reverse current preventing element 70.

If there is no leakage inductance $L_k$ or magnetizing inductance $L_m$ in the transformers 10 and 60, no ripple occurs in the output current $I_{out}$ of the Weinberg DC-DC conversion device. However, since a leakage inductance $L_k$ or a magnetizing inductance $L_m$ exists in the transformers 10 and 60, the ripple as illustrated in FIG. 3C occurs in the output current $I_{out}$ of the Weinberg DC-DC conversion device.

FIG. 3C is a result obtained by simulating under the conditions as illustrated in Table 1 below.

TABLE 1

| Simulation Conditions | Weinberg DC-DC Conversion Device illustrated in FIG. 2 |
|---|---|
| Input Voltage $V_{in}$[V] | 36 |
| Output Voltage $V_o$[V] | 50 |
| Output Power $P_o$ [W] | 750 |
| Turn Ratio of First Transformer | 1:1 |
| Turn Ratio of Second Transformer | 1:1 |
| Magnetizing Inductance $L_m$ [μH] | 1.86 |
| Leakage Inductance $L_k$ [μH] | 0.48 |
| Output Capacitance $C_o$ [μF] | 13.2 |

In Table 1 above, the first transformer 10 includes the first inductor 11 and the second inductor 12. In addition, a turn ratio of the first transformer 10 refers to a ratio with respect to the number of coils wound on the same core, where the first inductor 11 and the second inductor 12 constituting the first transformer 10 share one same core, and the number of coils wound around the core is 1:1. In Table 1 above, the second transformer 60 includes the third inductor 61 and the fourth inductor 62. In addition, a turn ratio of the second transformer 60 refers to a ratio with respect to the number of coils wound on the same core, where the third inductor 61 and the fourth inductor 62 constituting the second transformer 60 share another same core, and the number of coils wound around the core is 1:1.

When the first switch 20 is switched from the turned-on state to the turned-off state in the state in which the second switch 30 is turned off, the induced current generated in the fourth inductor 62 not only flows to the output terminal $n_{out}$ through the third reverse current preventing element 70, but also a current flow to the output terminal $n_{out}$ instantaneously occurs even through the first reverse current preventing element 40 and the second reverse current preventing element 50 due to the leakage inductance $L_k$ or magnetizing inductance $L_m$ existing in the transformers 10 and 60. In addition, due to such an instantaneous current flow, a ripple (about 22.7 A) as illustrated in FIG. 3C is generated in the output current $I_{out}$ of the Weinberg DC-DC conversion device.

In the same way, when the second switch 30 is switched from the turned-on state to the turned-off state in the state in which the first switch 20 is turned off, the induced current generated in the fourth inductor 62 not only flows to the output terminal $n_{out}$ through the third reverse current preventing element 70, but also a current flow to the output terminal $n_{out}$ instantaneously occurs even through the first reverse current preventing element 40 and the second reverse current preventing element 50 due to the leakage inductance $L_k$ or magnetizing inductance $L_m$ existing in the transformers 10 and 60. In addition, due to such an instantaneous current flow, a ripple (about 22.7 A) as illustrated in FIG. 3C is generated in the output current $I_{out}$ of the Weinberg DC-DC conversion device.

As such, when a ripple having a relatively large value occurs in the output current $I_{out}$, the RMS value of the output current $I_{out}$ also increases, thereby deteriorating the output capacitor 2 connected to the output terminal $n_{out}$, and shortening the lifespan of the output capacitor 2, and when the Weinberg DC-DC conversion device illustrated in FIG. 2 is used in a battery charge/discharge regulator of a satellite, the lifespan of the satellite is also shortened. Accordingly, it is necessary to provide a DC-DC conversion device capable of reducing the ripple of the output current.

Figure 4:
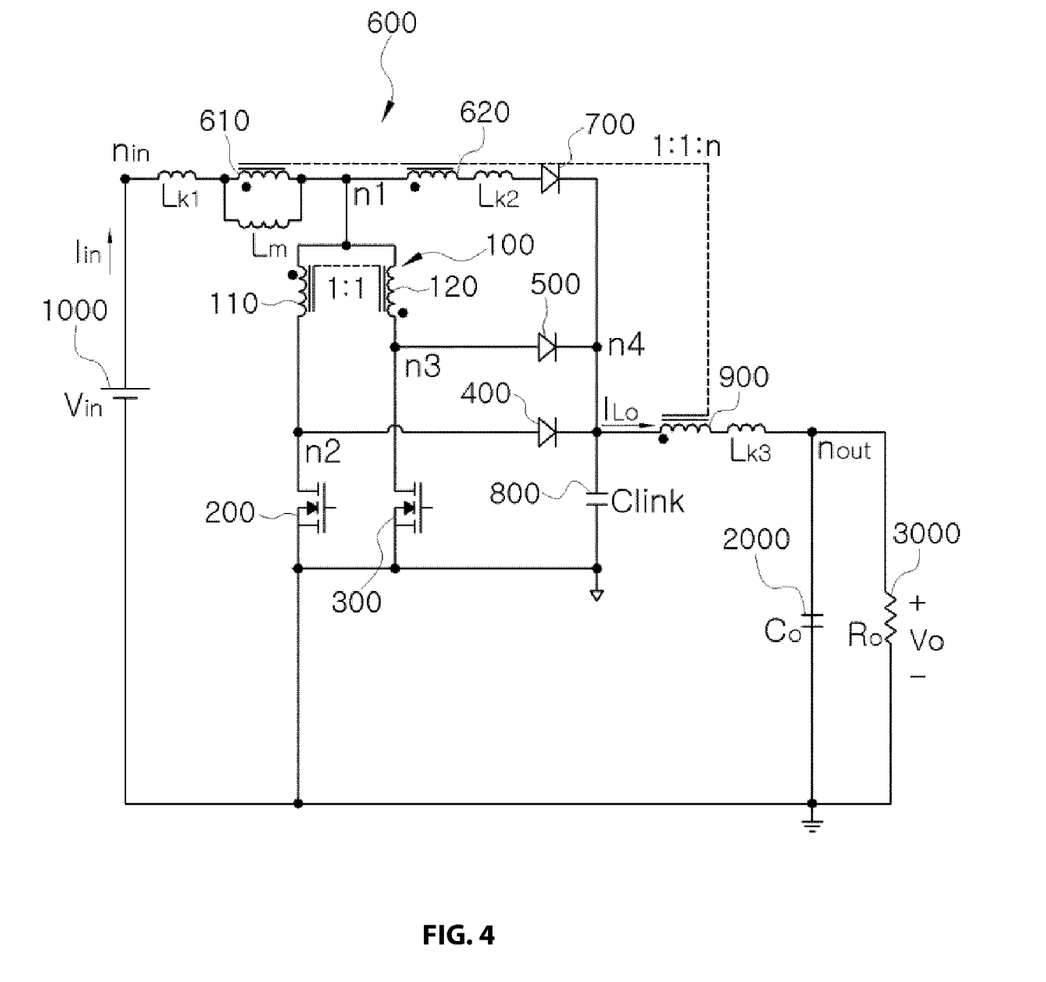
FIG. 4 is a diagram illustrating a DC-DC conversion device having a coupling inductor according to a first embodiment of the present disclosure.

FIG. 4 is a diagram illustrating a DC-DC conversion device having a coupling inductor according to a first embodiment of the present disclosure.

Referring to FIG. 4, a DC-DC conversion device according to a first embodiment of the present disclosure includes a first transformer 100, a first switch 200, a second switch 300, a first reverse current preventing element 400, a second reverse current preventing element 500, a second transformer 600, a third reverse current preventing element 700, a link capacitor 800, and an output inductor 900.

The first transformer 100 is connected between a ground and a first node n1 between an input terminal $n_{in}$ and an output terminal $n_{out}$, and includes a first inductor 110 and a second inductor 120 that are magnetically coupled to each other. Here, the first inductor 110 and the second inductor 120 are magnetically coupled to each other means that the first inductor 110 and the second inductor 120 share the same core and are inductively coupled to each other by the number of coils wound around the same core.

An input voltage $V_{in}$ is applied to the input terminal $n_{in}$ by a voltage source 1000, and the input voltage $V_{in}$ causes an input current $I_{in}$ to flow. In addition, an output voltage $V_o$ is applied to the output terminal $n_{out}$, and the magnitude of the output voltage $V_o$ depends on an RMS value of an output current $I_{Lo}$.

The first switch 200 is connected in series with the first inductor 110 between the first node n1 and the ground. The first switch 200 may be a FET (i.e., a first FET) controlled by a first control signal output from a control unit (not illustrated). When the first switch 200 is the first FET, the first control signal may be input to a gate electrode of the first FET, and turn-on and turn-off operations of the first FET may be controlled by the first control signal. In this case, a drain electrode of the first FET may be connected to a second node n2, and a source electrode of the first FET may be connected to the ground.

The second switch 300 is connected in series with the second inductor 120 between the first node n1 and the ground. The second switch 300 may be a FET (i.e., a second FET) controlled by a second control signal output from the control unit. When the second switch 300 is the second FET, the second control signal may be input to a gate electrode of the second FET, and turn-on and turn-off operations of the second FET may be controlled by the second control signal. In this case, a drain electrode of the second FET may be connected to a third node n3, and a source electrode of the second FET may be connected to the ground.

However, in the present disclosure, the first switch 200 or the second switch 300 is not necessarily limited to only the FET, and any element whose on-off operation may be controlled by the control signal of the control unit, such as a bipolar junction transistor (BJT) or a relay, may correspond to the first switch 200 or the second switch 300 according to the present disclosure.

The first reverse current preventing element 400 is connected to the second node n2 between the first inductor 110 and the first switch 200, and a fourth node n4 between the input terminal $n_{in}$ and the output terminal $n_{out}$. More specifically, an anode electrode of the first reverse current preventing element 400 is connected to the second node n2, and a cathode electrode of the first reverse current preventing element 400 is connected to the fourth node n4, so that a forward current may flow from the second node n2 to the fourth node n4.

The second reverse current preventing element 500 is connected to the third node n3 between the second inductor 120 and the second switch 300, and the fourth node n4 between the input terminal $n_{in}$ and the output terminal $n_{out}$. More specifically, an anode electrode of the second reverse current preventing element 500 is connected to the third node n3, and a cathode electrode of the second reverse current preventing element 500 is connected to the fourth node n4, so that a forward current may flow from the third node n3 to the fourth node n4.

The second transformer 600 is positioned between the input terminal $n_{in}$ and the output terminal $n_{out}$, and includes a third inductor 610 and a fourth inductor 620 that are magnetically coupled to each other. Here, the third inductor 610 and the fourth inductor 620 are magnetically coupled to each other means that the third inductor 610 and the fourth inductor 620 share the same core and are inductively coupled to each other by the number of coils wound around the same core.

In the DC-DC conversion device illustrated in FIG. 4, one terminal of the third inductor 610 is connected to the input terminal $n_{in}$, and the other terminal of the third inductor 610 is connected to the first node n1. In addition, one terminal of the fourth inductor 620 is connected to the first node n1, and the other terminal of the fourth inductor 620 is connected to the anode of the third reverse current preventing element 700.

The third reverse current preventing element 700 is connected to the fourth inductor 620 and the fourth node n4. More specifically, the anode of the third reverse current preventing element 700 is connected to the fourth inductor 620, and the cathode of the third reverse current preventing element 700 is connected to the fourth node n4.

The link capacitor 800 is connected to the fourth node n4, and the first switch 200 and the second switch 300. That is, one terminal of the link capacitor 800 is connected to the fourth node n4, and the other terminal of the link capacitor 800 is connected to the first switch 200 and the second switch 300. The link capacitor 800 serves to receive a DC voltage converted by the first transformer 100, the first switch 200, the second switch 300, the first reverse current preventing element 400, the second reverse current preventing element 500, and the second transformer, and store the DC voltage. In addition, the link capacitor 800 also serves to remove an AC component from the converted DC voltage.

The output inductor 900 is connected to the fourth node n4 and the output terminal $n_{out}$. That is, one terminal of the output inductor 900 is connected to the fourth node n4, and the other terminal of the output inductor 900 is connected to the output terminal $n_{out}$. The output inductor 900 serves to prevent an abrupt change in the output current $I_{Lo}$ when the output current $I_{Lo}$ flows from the fourth node n4 to the output terminal $n_{out}$.

In the present disclosure, the output inductor 900 is not formed of a separate inductor element, but is formed by being magnetically coupled to the third inductor 610 and the fourth inductor 620 constituting the second transformer 600. That is, in the present disclosure, the second transformer 600 may include the third inductor 610, the fourth inductor 620, and the output inductor 900. Here, the output inductor 900 is magnetically coupled to the third inductor 610 and the fourth inductor 620 means that the output inductor 900 shares the same core with the third inductor 610 and the fourth inductor 620 and is inductively coupled to each other by the number of coils wound around the same core. That is, in the present disclosure, the output inductor 900 constitutes a coupling inductor together with the third inductor 610 and the fourth inductor 620.

As described above, in the present disclosure, as the output inductor 900 is magnetically coupled to each other with the third inductor 610 and the fourth inductor 620, the volume and weight of the DC-DC conversion device may be reduced, and the price thereof may also be reduced, compared to the case in which the output inductor 900 is formed of the separate inductor element independently from the third inductor 610 and fourth inductor 620.

An output capacitor 2000 may be connected to the output terminal $n_{out}$ and the ground of the Weinberg DC-DC conversion device illustrated in FIG. 4, and an output resistor 3000 may be connected in parallel to the output capacitor 2000. Here, the output resistor 3000 corresponds to a load consuming the power generated by the voltage source 1000, and the output capacitor 2000 serves to store the power required by the output resistor 3000, and then to supply the power stored in the output capacitor 2 to the output resistor 3000 when the power is required by the output resistor 3000. The output capacitor 2000 is charged by an RMS value of the output current $I_{Lo}$.

Figure 5A:
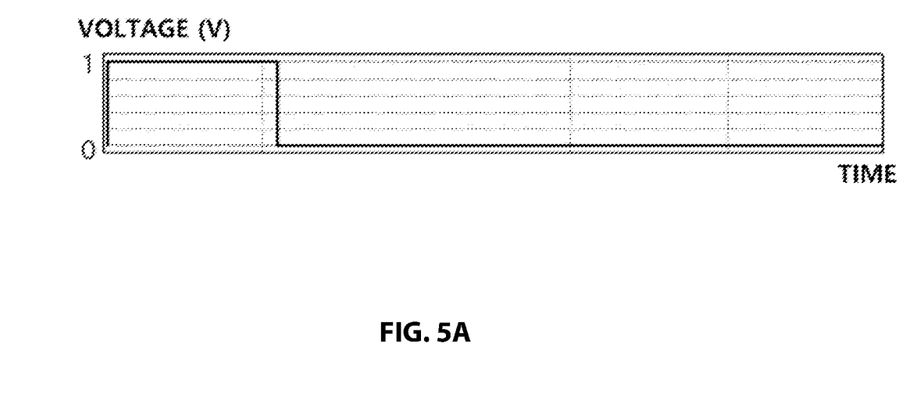
FIG. 5A is a diagram illustrating a waveform of a voltage applied to a first switch in the DC-DC conversion device of FIG. 4.
Figure 5B:
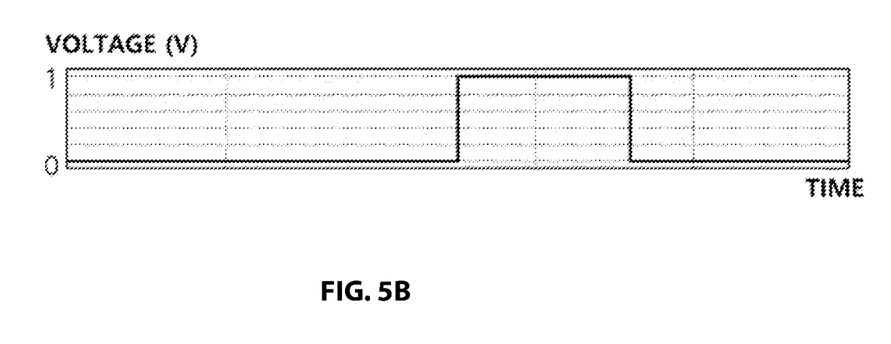
FIG. 5B is a diagram illustrating a waveform of a voltage applied to a second switch in the DC-DC conversion device of FIG. 4.
Figure 5C:
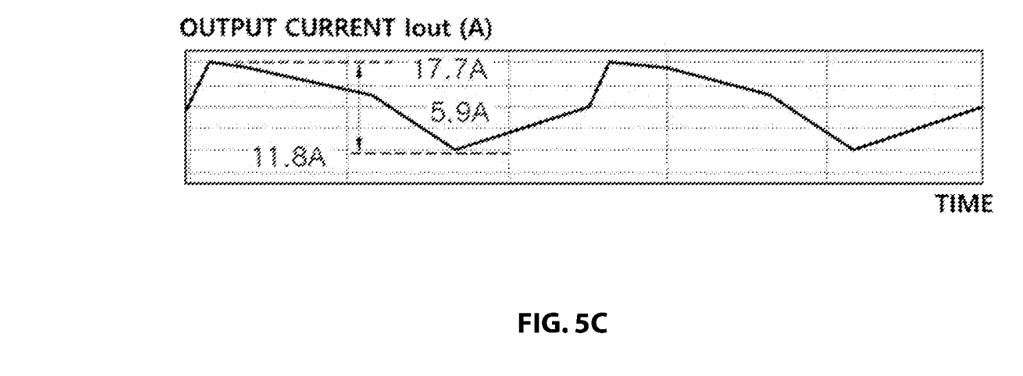
FIG. 5C is a diagram illustrating a waveform of an output current in the DC-DC conversion device of FIG. 4.

FIG. 5A is a diagram illustrating a waveform of a voltage applied to a first switch in the DC-DC conversion device of FIG. 4, FIG. 5B is a diagram illustrating a waveform of a voltage applied to a second switch in the DC-DC conversion device of FIG. 4, and FIG. 5C is a diagram illustrating a waveform of an output current in the DC-DC conversion device of FIG. 4.

FIG. 5 will be described in detail. First, FIG. 5A illustrates a control signal applied to the first switch 200 of the DC-DC conversion device according to the first embodiment of the present disclosure, and FIG. 5B illustrates a control signal applied to the second switch 300 of the DC-DC conversion device according to the first embodiment of the present disclosure, where the DC-DC conversion device also has sections in which the switch 300 is in the turned-off state when the first switch 200 is turned on, the first switch 200 is in the turned-off state when the second switch 300 is turned on, and both the first switch 200 and the second switch 300 are in the turned-off state.

The first switch 200 and the second switch 300 may each have a duty ratio of less than 50%. The first switch 200 and the second switch 300 may be alternately turned on at the same duty ratio (e.g., 30%) by a control signal output from the control unit. In this case, a 40% section in which both the first switch 200 and the second switch 300 are in the turn-off state corresponds to a section in which the control signal from the control unit is not input to the first switch 200 and the second switch 300.

First, when the first switch 200 is turned on in the state in which the second switch 300 is turned off, the input current $I_{in}$ by the voltage source 1000 mainly flows through a current path including the third inductor 610, the first inductor 110, and the first switch 200, and a small amount of input current $I_{in}$ flows through a current path including the third inductor 610, the fourth inductor 620, and the third reverse current preventing element 700. In this case, an induced current is generated in the second inductor 120 by the current flowing through the first inductor 110, and the induced current generated in the second inductor 120 flows through the third node n3 to the fourth node n4 through the second reverse current preventing element 500.

Next, when the first switch 200 is switched from the turned-on state to the turned-off state in the state in which the second switch 300 is turned off, the input current $I_{in}$ by the voltage source 1000 flows through the third inductor 610. In this case, an induced current is generated in the fourth inductor 620 by the current flowing through the third inductor 610, and the induced current generated in the fourth inductor 620 flows to the fourth node n4 through the third reverse current preventing element 700.

Next, when the second switch 300 is turned on in the state in which the first switch 200 is continuously turned off, the input current $I_{in}$ by the voltage source 1000 mainly flows through a current path including the third inductor 610, the second inductor 120, and the second switch 300, and a small amount of input current $I_{in}$ flows through a current path including the third inductor 610, the fourth inductor 620, and the third reverse current preventing element 700. In this case, an induced current is generated in the first inductor 110 by the current flowing through the second inductor 120, and the induced current generated in the first inductor 110 flows through the second node n2 to the fourth node n4 through the first reverse current preventing element 400.

As described above, when the first switch 200 is turned on in the state in which the second switch 300 is turned off, the induced current generated in the second inductor 120 flows through the third node n3 to the fourth node n4 through the second reverse current preventing element 500. Thereafter, when the first switch 200 is switched from the turned-on state to the turned-off state in the state in which the second switch 300 is continuously turned off, only the induced current generated in the fourth inductor 620 needs to flow to the fourth node n4 through the third reverse current preventing element 700.

If there is no leakage inductance $L_k$ or magnetizing inductance $L_m$ in the transformers 100 and 600, no ripple occurs in the output current $I_{Lo}$ of the DC-DC conversion device. However, since a leakage inductance $L_k$ or a magnetizing inductance $L_m$ exists in the transformers 100 and 600, the ripple as illustrated in FIG. 5C occurs in the output current $I_{Lo}$ of the DC-DC conversion device.

FIG. 5C is a result obtained by simulating under the conditions as illustrated in Table 2 below.

TABLE 2

| Simulation Conditions | DC-DC Conversion Device illustrated in FIG. 4 |
|---|---|
| Input Voltage $V_{in}$ [V] | 36 |
| Output Voltage $V_o$ [V] | 50 |
| Output Power $P_o$ [W] | 750 |
| Turn Ratio of First Transformer | 1:1 |
| Turn Ratio of Second Transformer | 1:1:1.3 |
| Magnetizing Inductance $L_m$ [μH] | 1.86 |
| Leakage Inductance $L_k$ [μH] | $L_{k1}$ = 0.48<br>$L_{k2}$ = 0.48<br>$L_{k3}$ = 1.28 |
| Output Capacitance $C_o$ [μF] | 11 |
| Link Capacitance $C_{link}$ [μF] | 2.2 |

In Table 2, a turn ratio of the first transformer 100 refers to a ratio with respect to the number of coils wound on the same core, where the first inductor 110 and the second inductor 120 constituting the first transformer 100 share one same core, and the number of coils wound around the core is 1:1. In Table 2, the second transformer 600 also includes the output inductor 900 in addition to the third inductor 610 and the fourth inductor 620. In addition, a turn ratio of the second transformer 600 refers to a ratio with respect to the number of coils wound on the same core, where the third inductor 610, the fourth inductor 620, and the output inductor 900 constituting the second transformer 600 share another same core, and the number of coils wound around the core is 1:1:1.3.

When the first switch 200 is switched from the turned-on state to the turned-off state in the state in which the second switch 300 is turned off, or when the second switch 300 is switched from the turned-on state to the turned-off state in the state in which the first switch 200 is turned off, the induced current generated in the fourth inductor 620 not only flows to the fourth node n4 through the third reverse current preventing element 700, but also a current flow to the fourth node n4 instantaneously occurs even through the first reverse current preventing element 400 and the second reverse current preventing element 500 due to the leakage inductance $L_k$ or the magnetizing inductance $L_m$ existing in the transformers 100 and 600. In addition, due to such an instantaneous current flow, a ripple as illustrated in FIG. 5C is generated in the output current $I_{Lo}$ of the DC-DC conversion device according to the first embodiment of the present disclosure.

However, it may be seen that only a ripple of about 5.9 A is generated in the output current $I_{Lo}$ of the DC-DC conversion device according to the first embodiment of the present disclosure as illustrated in FIG. 5C as compared to the ripple of 22.7 A being generated in the output current $I_{out}$ of the Weinberg DC-DC conversion according to FIG. 2 as illustrated in FIG. 3C.

This is because the output inductor 900 prevents an abrupt change in the output current $I_{Lo}$ flowing from the fourth node n4 to the output terminal $n_{out}$ even though the current flows through all the reverse current preventing elements 400, 500, and 700 like the Weinberg DC-DC conversion device according to FIG. 2, when the second switch 300 is continuously turned off and the first switch 200 is switched from the turned-on state to the turned-off, or when the first switch 200 is continuously turned off and the second switch 300 is switched from the turned-on state to the turned-off state, in the DC-DC conversion device according to the first embodiment of the present disclosure.

Figure 6:
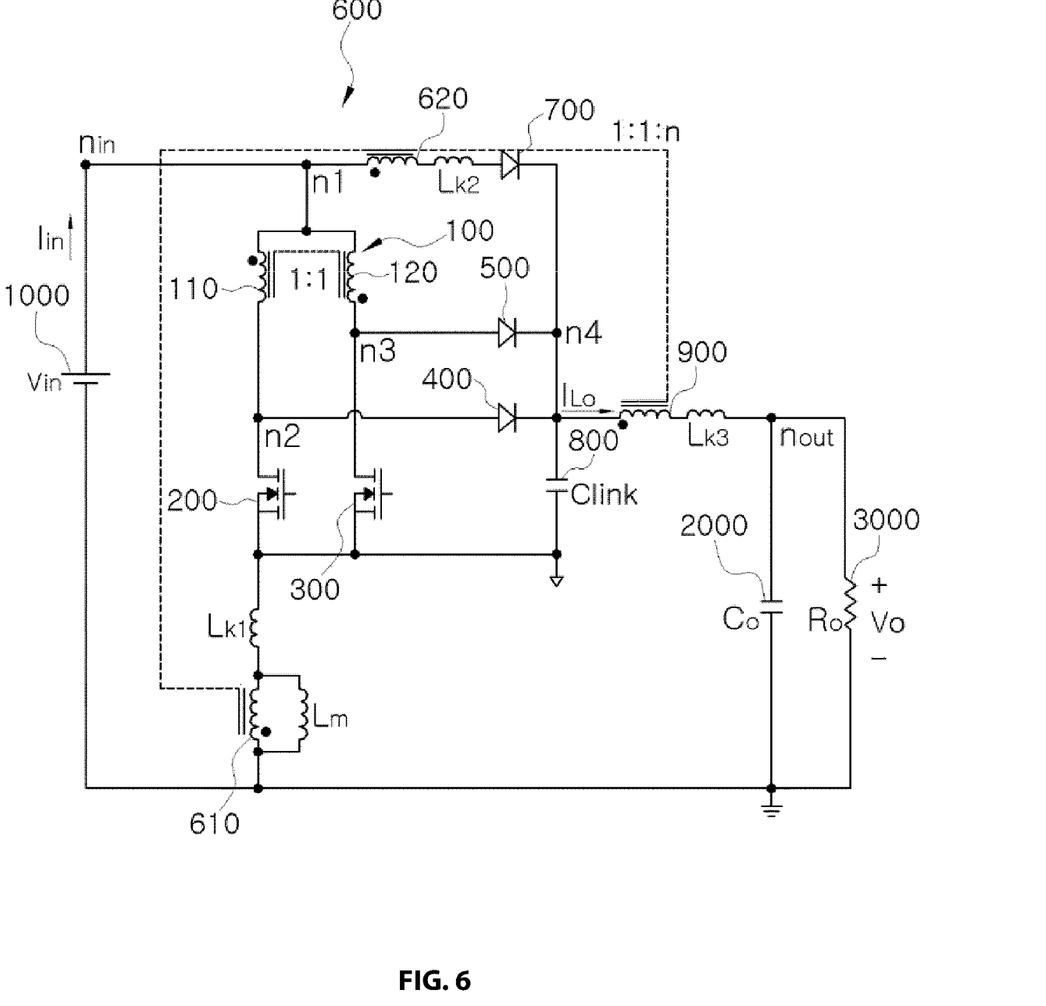
FIG. 6 is a diagram illustrating a DC-DC conversion device having a coupling inductor according to a second embodiment of the present disclosure.

FIG. 6 is a diagram illustrating a DC-DC conversion device having a coupling inductor according to a second embodiment of the present disclosure. Compared to the DC-DC conversion device illustrated in FIG. 4, the DC-DC conversion device illustrated in FIG. 6 differs only in the arrangement of the third inductor 610, and the arrangement and functions of other components are the same as those described above with respect to FIG. 4. Therefore, the DC-DC conversion device according to the second embodiment of the present disclosure will be mainly described with respect to the difference compared to the DC-DC converter according to the first embodiment.

In the DC-DC conversion device illustrated in FIG. 6, one terminal of the third inductor 610 is connected to the first switch 200, the second switch 300, and the link capacitor 800, and the other terminal of the third inductor 620 is connected to the ground. In addition, one terminal of the fourth inductor 620 is connected to the first node n1, and the other terminal of the fourth inductor 620 is connected to the anode of the third reverse current preventing element 700.

The third reverse current preventing element 700 is connected to the fourth inductor 620 and the fourth node n4. More specifically, the anode of the third reverse current preventing element 700 is connected to the fourth inductor 620, and the cathode of the third reverse current preventing element 700 is connected to the fourth node n4.

The DC-DC conversion device illustrated in FIG. 6 operates in the same manner as the DC-DC conversion device illustrated in FIG. 4. That is, the DC-DC conversion device also has sections in which the switch 300 is in the turned-off state when the first switch 200 is turned on, the first switch 200 is in the turned-off state when the second switch 300 is turned on, and both the first switch 200 and the second switch 300 are in the turned-off state.

The first switch 200 and the second switch 300 may each have a duty ratio of less than 50%. The first switch 200 and the second switch 300 may be alternately turned on at the same duty ratio (e.g., 30%) by a control signal output from the control unit. In this case, a 40% section in which both the first switch 200 and the second switch 300 are in the turn-off state corresponds to a section in which the control signal from the control unit is not input to the first switch 200 and the second switch 300.

First, when the first switch 200 is turned on in the state in which the second switch 300 is turned off, the input current $I_{in}$ by the voltage source 1000 mainly flows through a current path including the first inductor 110, the first switch 200, and the third inductor 610, and a small amount of input current $I_{in}$ flows through a current path including the fourth inductor 620 and the third reverse current preventing element 700. In this case, an induced current is generated in the second inductor 120 by the current flowing through the first inductor 110, and the induced current generated in the second inductor 120 flows through the third node n3 to the fourth node n4 through the second reverse current preventing element 500.

Next, when the first switch 200 is switched from the turned-on state to the turned-off state in the state in which the second switch 300 is turned off, the input current $I_{in}$ by the voltage source 1000 flows through the fourth inductor 620, and the current flowing through the fourth inductor 620 flows to the fourth node n4 through the third reverse current preventing element 700.

Next, when the second switch 300 is turned on in the state in which the first switch 200 is continuously turned off, the input current $I_{in}$ by the voltage source 1000 mainly flows through a current path including the second inductor 120, the second switch 300, and the third inductor 610, and a small amount of input current $I_{in}$ flows through a current path including the fourth inductor 620 and the third reverse current preventing element 700. In this case, an induced current is generated in the first inductor 110 by the current flowing through the second inductor 120, and the induced current generated in the first inductor 110 flows through the second node n2 to the fourth node n4 through the first reverse current preventing element 400.

As described above, when the first switch 200 is turned on in the state in which the second switch 300 is turned off, the induced current generated in the second inductor 120 flows through the third node n3 to the fourth node n4 through the second reverse current preventing element 500. Thereafter, when the first switch 200 is switched from the turned-on state to the turned-off state in the state in which the second switch 300 is continuously turned off, the current needs to flow to the fourth node n4 only through the path including the fourth inductor 620 and the third reverse current preventing element 700.

If there is no leakage inductance $L_k$ or magnetizing inductance $L_m$ in the transformers 100 and 600, no ripple occurs in the output current $I_{Lo}$ of the DC-DC conversion device. However, since a leakage inductance $L_k$ or a magnetizing inductance $L_m$ exists in the transformers 100 and 600, the ripple as illustrated in FIG. 5C occurs in the output current $I_{Lo}$ of the DC-DC conversion device.

That is, the DC-DC conversion device illustrated in FIG. 6 exhibits the same waveform of the output current under the same conditions as the DC-DC conversion device illustrated in FIG. 4. This is because the output inductor 900 prevents an abrupt change in the output current $I_{Lo}$ flowing from the fourth node n4 to the output terminal $n_{out}$ even though the current flows through all the reverse current preventing elements 400, 500, and 700 like the Weinberg DC-DC conversion device according to FIG. 2, when the second switch 300 is continuously turned off and the first switch 200 is switched from the turned-on state to the turned-off, or when the first switch 200 is continuously turned off and the second switch 300 is switched from the turned-on state to the turned-off state, also in the DC-DC conversion device according to the first embodiment of the present disclosure.

In the present disclosure, the reverse current preventing element can be a diode, but is not necessarily limited thereto, and a FET, a BJT, a relay, and the like may also be used as the reverse current preventing element of the present disclosure, as long as it is a device capable of preventing a reverse current.

As described above, although the present disclosure has been described with reference to the limited embodiments and drawings, the present disclosure is not limited to the above embodiments, and various modifications and variations are possible from these descriptions by those of ordinary skill in the art to which the present disclosure pertains. Therefore, the technical spirit of the present disclosure should be understood only by the claims, and all equivalents or equivalent modifications thereof are intended to fall within the scope of the technical spirit of the present disclosure.

DESCRIPTION OF REFERENCE NUMERALS

100: first transformer
110: first inductor
120: second inductor
200: first switch
300: second switch
400: first reverse current preventing element
500: second reverse current preventing element
600: second transformer
610: third inductor
620: fourth inductor
700: third reverse current preventing element
800: link capacitor
900: output inductor
1000: voltage source
2000: output capacitor
3000: output resistor

The invention claimed is:

1. A DC-DC conversion device comprising:
a first transformer connected between a ground and a first node between an input terminal to which an input voltage is applied and an output terminal to which an output voltage is applied, and including a first inductor and a second inductor that are magnetically coupled to each other;
a first switch connected in series with the first inductor between the first node and the ground;
a second switch connected in series with the second inductor between the first node and the ground;
a first reverse current preventing element connected to a second node between the first inductor and the first switch and a fourth node between the input terminal and the output terminal;
a second reverse current preventing element connected to a third node between the second inductor and the second switch, and the fourth node;
a second transformer positioned between the input terminal and the output terminal and including a third inductor and a fourth inductor that are magnetically coupled to each other;
a third reverse current preventing element connected to the fourth inductor and the fourth node;
a link capacitor connected to the fourth node, and the first switch and the second switch; and
an output inductor connected to the fourth node and the output terminal,
wherein the output inductor is magnetically coupled to the third inductor and the fourth inductor,
wherein one terminal of the third inductor is connected to each of the first switch, the second switch, and the link capacitor, and the other terminal of the third inductor is connected to the ground such that the third inductor is positioned between the ground and each of the first switch, the second switch, and the link capacitor, and
wherein one terminal of the fourth inductor is connected to the first node, and the other terminal of the fourth inductor is connected to an anode of the third reverse current preventing element.

2. The DC-DC conversion device of claim 1, wherein the DC-DC conversion device has sections in which the second switch is in a turned-off state when the first switch is turned on, the first switch is in the turned-off state when the second switch is turned on, and both the first switch and the second switch are in the turned-off state.

3. The DC-DC conversion device of claim 2, wherein the first switch and the second switch are alternately turned on at the same duty ratio, and
the duty ratio is less than 50%.

4. The DC-DC conversion device of claim 2, wherein in the section in which both the first switch and the second switch are in the turned-off state, an output current flows only through the third reverse current preventing element.

5. The DC-DC conversion device of claim 1, wherein the first switch is a first field effect transistor (FET) whose turn-on and turn-off operations are controlled by a first control signal input to a gate electrode of the first FET, and
the second switch is a second FET whose turn-on and turn-off operations are controlled by a second control signal input to a gate electrode of the second FET.

6. The DC-DC conversion device of claim 5, further comprising a control unit for outputting the first control signal to the gate electrode of the first FET and outputting the second control signal to the gate electrode of the second FET.

7. A DC-DC conversion device comprising:
a first transformer connected between a ground and a first node between an input terminal to which an input voltage is applied and an output terminal to which an output voltage is applied, and including a first inductor and a second inductor that are magnetically coupled to each other;
a first switch connected in series with the first inductor between the first node and the ground;
a second switch connected in series with the second inductor between the first node and the ground;
a first reverse current preventing element connected to a second node between the first inductor and the first switch and a fourth node between the input terminal and the output terminal;
a second reverse current preventing element connected to a third node between the second inductor and the second switch, and the fourth node;
a second transformer positioned between the input terminal and the output terminal and including a third inductor and a fourth inductor that are magnetically coupled to each other;
a third reverse current preventing element connected to the fourth inductor and the fourth node;
a link capacitor connected to the fourth node, and the first switch and the second switch; and
an output inductor connected to the fourth node and the output terminal,
wherein the output inductor is magnetically coupled to the third inductor and the fourth inductor,
wherein one terminal of the third inductor is connected to the first switch, the second switch, and the link capacitor, and the other terminal of the third inductor is connected to the ground,
wherein one terminal of the fourth inductor is connected to the first node, and the other terminal of the fourth inductor is connected to an anode of the third reverse current preventing element, wherein, when the first switch is turned on and the second switch is off, current primarily flows through the first inductor, the first switch, and the third inductor, with a lesser amount of the current flowing through the fourth inductor and the third reverse current preventing element,
wherein, when the first switch is switched off and the second switch remains off, the current flows through the fourth inductor, and the current flowing through the fourth inductor passes through the third reverse current preventing element to the fourth node, and
wherein, when the first switch remains off and the second switch is turned on, the current primarily flows through the second inductor, the second switch, and the third inductor, with a lesser amount of the current flowing through the fourth inductor and the third reverse current preventing element.

8. A DC-DC conversion device comprising:
a first transformer connected between a ground and a first node between an input terminal to which an input voltage is applied and an output terminal to which an output voltage is applied, and including a first inductor and a second inductor that are magnetically coupled to each other;
a first switch connected in series with the first inductor between the first node and the ground;
a second switch connected in series with the second inductor between the first node and the ground;
a first reverse current preventing element connected to a second node between the first inductor and the first switch and a fourth node between the input terminal and the output terminal;
a second reverse current preventing element connected to a third node between the second inductor and the second switch, and the fourth node;
a second transformer positioned between the input terminal and the output terminal and including a third inductor and a fourth inductor that are magnetically coupled to each other;
a third reverse current preventing element connected to the fourth inductor and the fourth node;
a link capacitor connected to the fourth node, and the first switch and the second switch; and
an output inductor connected to the fourth node and the output terminal, wherein the output inductor is magnetically coupled to the third inductor and the fourth inductor,
wherein one terminal of the third inductor is connected to the first switch, the second switch, and the link capacitor, and the other terminal of the third inductor is connected to the ground,
wherein one terminal of the fourth inductor is connected to the first node, and the other terminal of the fourth inductor is connected to an anode of the third reverse current preventing element, and
wherein the third inductor and the fourth inductor are not arranged in parallel.

* * * * *